(12) United States Patent
Bannon et al.

(10) Patent No.: US 9,561,862 B2
(45) Date of Patent: Feb. 7, 2017

(54) STALL RECOVERY SYSTEM FOR A RAM AIR TURBINE

(71) Applicant: Hamilton Sundstrand Corporation, Windsor Locks, CT (US)

(72) Inventors: David G. Bannon, Rockford, IL (US); William E. Seidel, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 450 days.

(21) Appl. No.: 14/185,347

(22) Filed: Feb. 20, 2014

(65) Prior Publication Data

US 2015/0232194 A1    Aug. 20, 2015

(51) Int. Cl.
  *B64D 41/00*    (2006.01)

(52) U.S. Cl.
  CPC ......... *B64D 41/007* (2013.01); *F05D 2220/34* (2013.01); *Y02T 50/53* (2013.01)

(58) Field of Classification Search
  CPC ..... B64D 41/007; Y02T 50/53; F05D 2220/34
  USPC .............. 60/413, 468, 226.1, 447; 417/222.1
  See application file for complete search history.

(56) References Cited

U.S. PATENT DOCUMENTS

| | | | | |
|---|---|---|---|---|
| 4,118,926 A | * | 10/1978 | Curvino | F02C 7/262 60/223 |
| 4,722,180 A | * | 2/1988 | Lindler | F02C 9/28 60/39.27 |
| 4,825,639 A | * | 5/1989 | Krukoski | F04D 27/0207 60/773 |
| 5,051,918 A | * | 9/1991 | Parsons | F04D 27/001 415/17 |
| 5,145,324 A | * | 9/1992 | Dickes | B64D 41/007 417/222.1 |
| 5,375,412 A | * | 12/1994 | Khalid | F02C 9/16 415/27 |
| 5,726,891 A | * | 3/1998 | Sisson | F04D 27/001 415/17 |
| 7,197,870 B2 | | 4/2007 | Bannon | |
| 2006/0083633 A1 | * | 4/2006 | Bannon | B64D 41/007 417/375 |
| 2006/0112697 A1 | * | 6/2006 | Rowe | F02C 7/262 60/772 |

* cited by examiner

*Primary Examiner* — Steven A. Reynolds
(74) *Attorney, Agent, or Firm* — Kinney & Lange, P.A.

(57) ABSTRACT

In one aspect, a ram air turbine stall recovery system includes a ram air turbine, a hydraulic pump powered by the ram air turbine with the hydraulic pump having a pump inlet and a pump outlet, an electric generator powered by the ram air turbine, a bypass line that connects the pump outlet to the pump inlet, a bypass valve located on the bypass line between the pump outlet and the pump inlet; and a controller responsive to an input signal that indicates a potential stall condition of the ram air turbine. The controller causes the bypass valve to open to allow a hydraulic fluid to flow through the bypass line in order to reduce a pressure within the hydraulic pump.

16 Claims, 1 Drawing Sheet

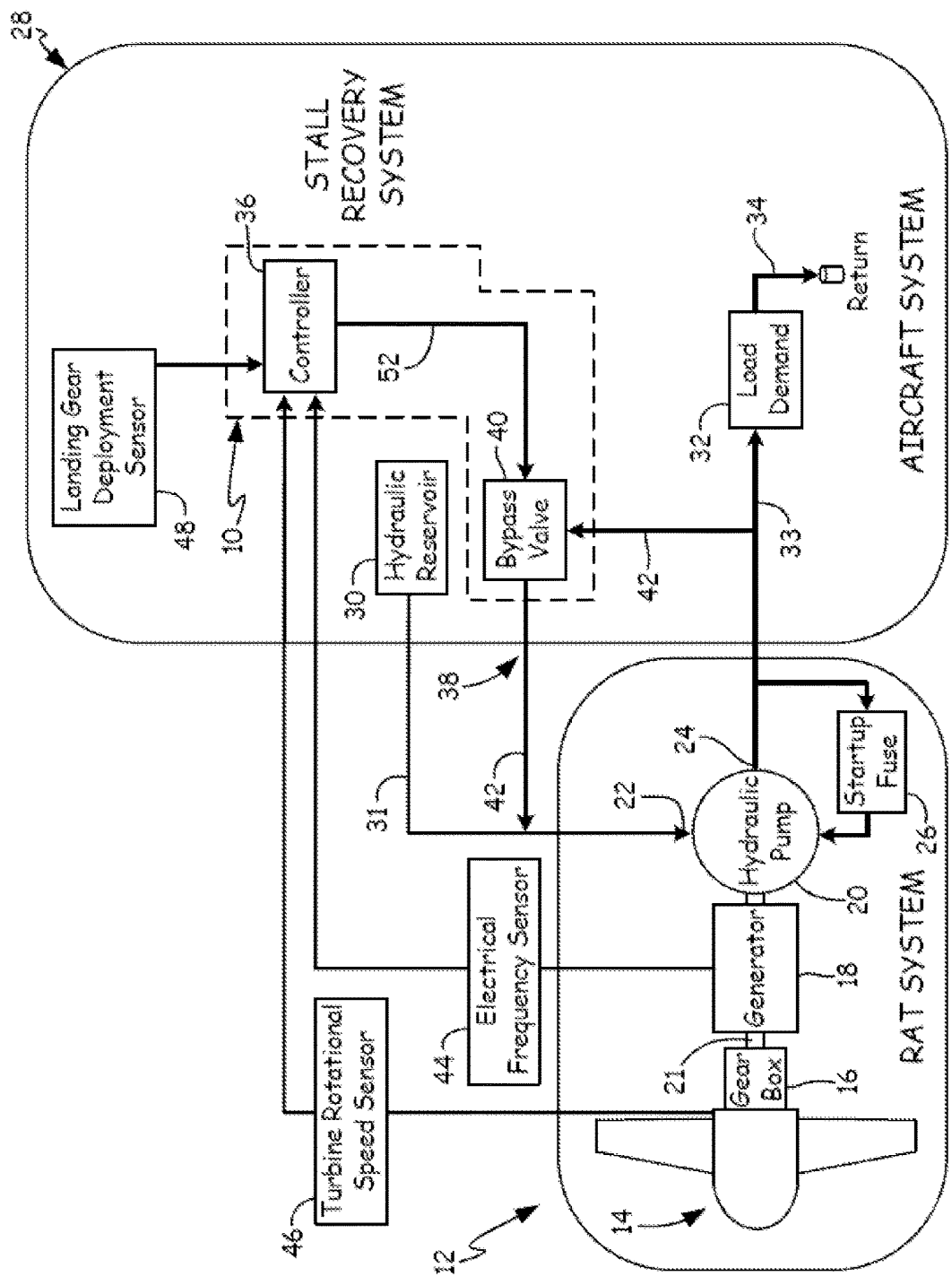

STALL RECOVERY SYSTEM FOR A RAM AIR TURBINE

BACKGROUND

The disclosure relates to emergency supplemental power supplies for aeronautical applications, and more particularly to a ram air turbine for generating emergency supplemental power for aircraft in flight.

A Ram Air Turbine (RAT) is a device for generating emergency supplemental power in a wide variety of aircraft. A RAT may generate hydraulic power, electric power, or both. A RAT incorporates a turbine that extracts power from an air stream proximate to the aircraft in flight. The turbine is coupled to suitable power generating equipment, such as a hydraulic pump for hydraulic power and an electric generator for electric power.

The placement of a RAT on some aircraft is such that the aircraft landing gear deployment causes the landing gear to pass in front of the RAT, thereby blocking incoming airflow to the RAT. For RATs that drive a hydraulic pump, the reduction in airflow may cause the RAT to stall. When the RAT stalls, it may continue to rotate at a low speed, typically approximately 800 rpm, such that equilibrium exists between the turbine torque and the load torque.

Once the stall occurs, the RAT may not start back up, even when the landing gear completes its deployment and it no longer blocks the airflow to the RAT.

SUMMARY

In one aspect, a ram air turbine stall recovery system includes a ram air turbine, a hydraulic pump powered by the ram air turbine with the hydraulic pump having a pump inlet and a pump outlet, an electric generator powered by the ram air turbine, a bypass line that connects the pump outlet to the pump inlet, a bypass valve located on the bypass line between the pump outlet and the pump inlet; and a controller responsive to an input signal that indicates a potential stalled condition of the ram air turbine. The controller causes the bypass valve to open to allow a hydraulic fluid to flow through the bypass line in order to reduce a pressure within the hydraulic pump.

BRIEF DESCRIPTION OF THE DRAWINGS

FIG. 1 is a schematic showing a stall recovery system for a RAT system on an aircraft.

DETAILED DESCRIPTION

The stall recovery system of this disclosure solves the problem of the RAT system's failure to resume full operation after a stall due to resistance (pump load torque) caused by the hydraulic pump attached to the RAT system to provide hydraulic power. The stall recovery system allows the RAT to recover by creating a short circuit with the hydraulic fluid that reduces the resistance/pressure within the hydraulic pump. The reduction in resistance/pressure within the hydraulic pump reduces the pump load torque the RAT system must overcome to resume full operation and allows the RAT system turbine to rotate more easily. Upon return to full operation, the short circuit is closed and resistance/pressure is introduced into the hydraulic pump to provide hydraulic power to satisfy hydraulic load demands in the aircraft system.

FIG. 1 is a schematic showing stall recovery system 10 for RAT system 12. RAT system 12 includes turbine 14, gear box 16, generator 18, hydraulic pump 20 (which includes pump inlet 22 and pump outlet 24), and startup fuse 26. Turbine 14, gear box 16, generator 18, and hydraulic pump 20 may be connected to one another by shaft 21. RAT system 12 may be located on an aircraft that includes aircraft system 28. Aircraft system 28 includes hydraulic reservoir 30, hydraulic load demand 32, and return 34. Hydraulic reservoir 30 is fluidically connected to pump inlet 22 by pump inlet line 31, while load demand 32 is fluidically connected to pump outlet 24 by pump outlet line 33. While not shown in FIG. 1, return 34 may be fluidically connected to hydraulic pump 20 and/or hydraulic reservoir 30. Additionally, stall recovery system 10 may be located on aircraft system 28 or may be within RAT system 12. In FIG. 1, stall recovery system 10 is located on aircraft system 28 and includes controller 36 and bypass circuit 38, which includes bypass valve 40 and bypass line 42.

Controller 36 receives input signals from electrical frequency sensor 44, turbine rotational speed sensor 46, and/or landing gear deployment sensor 48 and causes bypass valve 40 to open or close through command 52 depending on the input signals received.

RAT system 12 is deployed in emergency situations to provide electrical and hydraulic power to components proximate RAT system 12, such as aircraft components. When deployed, high velocity fluid, such as air, causes turbine 14 to rotate. The rotation of turbine 14 results in rotational energy (RAT load torque) being imparted to shaft 21 along which gear box 16, generator 18, and hydraulic pump 20 are located. Gear box 16 gears the rotation of shaft 21 to ensure the rotational speed is within certain limits. Generator 18 transforms the rotational energy (RAT load torque) into electrical power that is outputted to various components. Hydraulic pump 20 transforms the rotational energy (RAT load torque) into hydraulic power by pressurizing hydraulic fluid that is outputted to load demand 32 through pump outlet line 33.

During normal operating conditions of RAT system 12, the hydraulic fluid is introduced into hydraulic pump 20 by hydraulic reservoir 30 through pump inlet line 31. Hydraulic reservoir 30 may be fluidically connected to load demand 32 by return 34. After load demand 32 has exhausted the hydraulic power provided to load demand 32, return 34 completes the hydraulic fluid cycle by returning the hydraulic fluid to either hydraulic pump 20 or hydraulic reservoir 30.

Upon initial deployment of RAT system 12, the high velocity air acting on turbine 14 may not produce enough RAT load torque to overcome the resistance (pump load torque) on the shaft caused by the pressurized hydraulic fluid within hydraulic pump 20. Therefore, startup fuse 26 reduces the pressure within hydraulic pump 20 and allows turbine 14 to rotate more easily. Once turbine 14 is experiencing normal operating conditions, startup fuse 26 deactivates and hydraulic pump 20 introduces pump load torque onto shaft 21.

During operation of RAT system 12, various circumstances may cause turbine 14 to slow or stop rotating such that the RAT load torque produced by turbine 14 is not enough to overcome the resistance on shaft 21 by hydraulic pump 20. This stall condition prevents maximum electrical and hydraulic power output and can lead to dangerous conditions on the aircraft due to the lack of power to important systems, such as guidance and control systems. Therefore, it is important for RAT system 12 to include a system that reduces the resistance on shaft 21 and allows turbine 14 to return to operating conditions that produce sufficient RAT load torque. This is accomplished by stall recovery system 10, where controller 36 instructs bypass circuit 38 (through command 52) to reduce the pump load torque depending on input signals from various components. Controller 36 uses the input signals to determine if RAT system 10 is in or entering a potential stall condition and takes proper measures to avoid the stall.

When controller 36 determines that a stall condition is occurring or is likely to occur, it causes bypass valve 40, which is a valve located on bypass line 42, to open. The opening of bypass valve 40 allows the hydraulic fluid within pump outlet line 33 to flow easily to pump inlet line 31 because bypass line 42 fluidically connects pump outlet line 33 to pump inlet line 31. Bypass circuit (open bypass valve 40 and bypass line 42) is configured to allow the hydraulic fluid to bypass load demand 32, return 34, and hydraulic reservoir 30 and easily flow from pump outlet 24 to pump inlet 22. The opening of bypass valve 40 causes the pressure (and therefore the pump load torque) within hydraulic pump 20 to decrease quickly and significantly upon the opening of bypass valve 40. Bypass valve 40 and bypass line 42 should be large enough so as to provide little resistance to the hydraulic fluid flowing through bypass circuit 38. Additionally, bypass line 42 may also be configured to connect directly to pump inlet 22 and pump outlet 24. Bypass valve 40 may be any assembly that, when instructed, allows a fluid to flow through a line and, upon another instruction, prevents fluid from flowing through a line.

Upon receiving an input signal that indicates that the stall condition is over or did not occur, controller 36 causes bypass valve 40 to close. The closure of bypass valve 40 prevents hydraulic fluid from flowing through bypass circuit 38 and returns hydraulic pump 20 to normal operating conditions (the pressure and pump load torque within hydraulic pump 20 increase due to load demand 32, return 34, and hydraulic reservoir 30).

The input signals received by controller 36 can come from a number of components, including input signals not specifically mentioned in this disclosure. This disclosure discusses some continuous input signals and some intermittent input signals.

One continuous input signal is produced by electrical frequency sensor 44, which provides an input signal to controller 36 representing the electrical frequency of the electrical power output of generator 18. In a stall condition, turbine 14 rotates at a reduced speed than its rotational speed during normal operating conditions. This reduction in rotational speed produces less electrical power than that in normal operating conditions. Electrical frequency sensor 44 provides information to controller 36 such that controller 36 will determine that RAT system 12 has entered a stall condition when the electrical power outputted by generator 18 is reduced. When the input signal from electrical frequency sensor 44 indicates that the electrical frequency produced by generator 18 has reduced, controller 36 causes bypass valve 40 (through command 52) to open. When electrical frequency sensor 44 indicates that the electrical frequency has returned to normal, controller 36 may cause bypass valve 40 to close. This is a continuous input signal because electrical frequency sensor 44 continuously informs controller 36 of the electrical frequency/electrical power output.

Another continuous input signal is turbine rotational speed sensor 46. Instead of measuring electrical power output like electrical frequency sensor 44, turbine rotational speed sensor 46 senses and informs controller 36 of the rotational speed of turbine 14. When the rotational speed drops below a specific level, controller 36 will determine that RAT system 12 has entered a stall condition and may cause bypass valve 40 (through command 52) to open. When turbine rotational speed sensor 46 indicates that the rotational speed of turbine 14 has returned to normal, controller 36 may cause bypass valve 40 to close. As with electrical frequency sensor 44, turbine rotational speed sensor 46 is a continuous input signal because it continuously informs controller 36 of the rotational speed of turbine 14.

One intermittent input signal is provided by landing gear deployment sensor 48, which provides an input signal to controller 36 that the aircraft is about to deploy the landing gear or currently is deploying the landing gear. Landing gear deployment sensor 48 may be useful on an aircraft that is configured such that the landing gear passes in front of RAT system 12 during deployment. When this happens, the landing gear may block the flow of high velocity fluid into turbine 14 and reduce the rotational speed of turbine 14 so the RAT load torque is not enough to overcome the pump load torque, causing a stall condition. Landing gear deployment sensor 48 may be connected to the aircraft systems that deploy the landing gear. When notified of the deployment of the landing gear, landing gear deployment sensor 48 informs controller 36 of the potential stall condition and controller 36 may cause bypass valve 40 (through command 52) to open. When the landing gear has finished deployment, controller 36 causes bypass valve 40 to close. Controller 36 may be aware that the landing gear has finished deployment from an input signal from landing gear deployment sensor 48 or from a timed signal within controller 36 that opens bypass valve 40 for a set duration depending on the already known time it takes for the landing gear to deploy. Landing gear deployment sensor 48 is an intermittent input signal because it does not continuously inform controller 36 of the status of the landing gear.

Stall recovery system 10 and RAT system 12 may include none, one, or all of the input signals and/or sensors described in this disclosure, depending on necessary aircraft redundancies, control systems, and other factors.

Discussion of Possible Embodiments

The following are non-exclusive descriptions of possible embodiments of the present invention.

A ram air turbine stall recovery system may include a ram air turbine, a hydraulic pump powered by the ram air turbine with the hydraulic pump having a pump inlet and a pump outlet, an electric generator powered by the ram air turbine, a bypass line that connects the pump outlet to the pump inlet, a bypass valve located on the bypass line between the pump outlet and the pump inlet, and a controller responsive to an input signal that indicates a potential stalled condition of the ram air turbine, wherein the controller causes the bypass valve to open to allow a hydraulic fluid to flow through the bypass line in order to reduce a pressure within the hydraulic pump.

The system of the preceding paragraph can optionally include, additionally and/or alternatively, any one or more of the following features, configurations, and/or components:

The controller causes the bypass valve to open when the input signal indicates that the ram air turbine has entered a stalled condition.

The controller controls the bypass valve as a function of frequency of electrical power generated by the electrical generator.

The controller causes the bypass valve to open when the input signal indicates that the electrical frequency is below a normal operating condition and the ram air turbine is in a stalled condition.

The controller causes the bypass valve to close when the input signal indicates that the electrical frequency is at or above a normal operating condition and the ram air turbine is not in a stalled condition.

The controller causes the bypass valve to open or close as a function of sensed rotational speed of the ram air turbine.

The controller causes the bypass valve to open when the input signal indicates that the rotational speed of the ram air turbine is below a normal operating condition and the ram air turbine is in a stalled condition.

The controller causes the bypass valve to close when the input signal indicates that the rotational speed of the ram air turbine is at or above a normal operating condition and the ram air turbine is not in a stalled condition.

The ram air turbine is on an aircraft that includes landing gear, and the controller causes the bypass valve to open when the input signal indicates that the landing gear is being deployed.

The ram air turbine is on an aircraft that includes landing gear, and the controller causes the bypass valve to open when the input signal indicates that the ram air turbine is in a stalled condition.

In another embodiment, a ram air turbine stall recovery system may include a ram air turbine, a hydraulic pump powered by the ram air turbine, a bypass circuit fluidically connected to the hydraulic pump, and a controller that controls the bypass circuit as a function of an operating condition of the ram air turbine, the operating condition being indicated by at least one input signal, wherein the controller causes the bypass circuit to reduce a pressure within the hydraulic pump when at least one input signal indicates that the ram air turbine has entered a potential stalled condition.

The system of the preceding paragraph can optionally include, additionally and/or alternatively, any one or more of the following features, configurations, and/or components:

The bypass circuit includes a bypass line that connects a pump outlet to a pump inlet and a bypass valve controlled by the controller and configured to open to allow the hydraulic fluid to flow through the bypass line and close to prevent the hydraulic fluid from flowing through the bypass line.

The controller controls the bypass circuit as a function of an electrical frequency produced by an electrical generator driven by the ram air turbine.

The controller controls the bypass circuit as a function of rotational speed of the ram air turbine.

The ram air turbine stall recovery system is on an aircraft that includes landing gear, and the controller controls the bypass circuit as a function of deployment state of the landing gear.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ram air turbine stall recovery system comprising:
   a ram air turbine;
   a hydraulic pump powered by the ram air turbine, the hydraulic pump includes a pump inlet and a pump outlet;
   an electric generator powered by the ram air turbine;
   a bypass line that connects the pump outlet to the pump inlet;
   a bypass valve located on the bypass line between the pump outlet and the pump inlet; and
   a controller responsive to an input signal that indicates a potential stalled condition of the ram air turbine, wherein the controller causes the bypass valve to open to allow a hydraulic fluid to flow through the bypass line in order to reduce a pressure within the hydraulic pump and the controller directs the bypass valve as a function of frequency of electrical power generated by the electric generator.

2. The system in claim 1, wherein the controller causes the bypass valve to open when the input signal indicates that the ram air turbine has entered a stalled condition.

3. The system of claim 1, wherein the controller causes the bypass valve to open when the input signal indicates that the electrical frequency is below a normal operating condition and the ram air turbine is in a stalled condition.

4. The system of claim 1, wherein the controller causes the bypass valve to close when the input signal indicates that the electrical frequency is at or above a normal operating condition and the ram air turbine is not in a stalled condition.

5. The system of claim 1, wherein the controller causes the bypass valve to open or close as a function of sensed rotational speed of the ram air turbine.

6. The system of claim 5, wherein the controller causes the bypass valve to open when the input signal indicates that the rotational speed of the ram air turbine is below a normal operating condition and the ram air turbine is in a stalled condition.

7. The system of claim 5, wherein the controller causes the bypass valve to close when the input signal indicates that the rotational speed of the ram air turbine is at or above a normal operating condition and the ram air turbine is not in a stalled condition.

8. The system of claim 1, wherein the ram air turbine is on an aircraft that includes landing gear, and the controller causes the bypass valve to open when the input signal indicates that the landing gear is being deployed.

9. The system of claim 1, wherein the ram air turbine is on an aircraft that includes landing gear, and the controller causes the bypass valve to open when the input signal indicates that the ram air turbine is in a stalled condition.

10. A ram air turbine stall recovery system comprising:
    a ram air turbine;
    a hydraulic pump powered by the ram air turbine;
    a bypass circuit fluidically connected to the hydraulic pump; and
    a controller that controls the bypass circuit as a function of an operating condition of the ram air turbine, the operating condition being indicated by at least one input signal,
    wherein the controller causes the bypass circuit to reduce a pressure within the hydraulic pump when at least one input signal indicates that the ram air turbine has entered a potential stalled condition and the controller directs the bypass circuit as a function of deployment state of the landing gear.

11. The system of claim 10, wherein the bypass circuit includes a bypass line that connects a pump outlet to a pump inlet and a bypass valve controlled by the controller and configured to open to allow the hydraulic fluid to flow through the bypass line and close to prevent the hydraulic fluid from flowing through the bypass line.

12. The system of claim 10, wherein the controller controls the bypass circuit as a function of an electrical frequency produced by an electrical generator driven by the ram air turbine.

13. The system of claim 10, wherein the controller controls the bypass circuit as a function of rotational speed of the ram air turbine.

14. A ram air turbine stall recovery system on an aircraft that includes landing gear comprising:
   a ram air turbine;
   a hydraulic pump powered by the ram air turbine, the hydraulic pump includes a pump inlet and a pump outlet;
   an electric generator powered by the ram air turbine;
   a bypass line that connects the pump outlet to the pump inlet;
   a bypass valve located on the bypass line between the pump outlet and the pump inlet; and
   a controller responsive to an input signal that indicates a potential stalled condition of the ram air turbine, wherein the controller causes the bypass valve to open when the input signal indicates that the landing gear is being deployed to allow a hydraulic fluid to flow through the bypass line in order to reduce a pressure within the hydraulic pump.

15. The ram air turbine stall recovery system of claim 14, wherein the controller causes the bypass valve to close when the input signal indicates that the rotational speed of the ram air turbine is at or above a normal operating condition and the ram air turbine is not in a stalled condition.

16. The ram air turbine stall recovery system of claim 14, wherein the controller causes the bypass valve to close when the input signal indicates that an electrical frequency that is a function of electrical power produced by the electrical generator is at or above a normal operating condition and the ram air turbine is not in a stalled condition.

\* \* \* \* \*